Dec. 8, 1931.    G. W. DE FOREST    1,835,020

GAUGE VALVE

Filed May 27, 1930

INVENTOR.
GEORGE W. DE FOREST.
BY *Philip S. Hopkins*
ATTORNEY.

Patented Dec. 8, 1931

1,835,020

UNITED STATES PATENT OFFICE

GEORGE W. DE FOREST, OF BINGHAMTON, NEW YORK

GAUGE VALVE

Application filed May 27, 1930. Serial No. 455,990.

My invention relates to gauge valves and particularly to a valve of the general type used on boilers for determining the water or steam level therein.

The use of devices of this character usually includes placing two or more valves at different levels on a boiler, and if it is desired to ascertain the water level in the boiler, the valves are opened, one at a time at the various levels. Obviously, continued operation of these valves for this purpose results in wear on either the valve or the valve seat, or the accumulation of dirt or other foreign matter on the valve or valve seat, often resulting in a leakage. When such leakage occurs, the valve of course must be removed for cleaning, repair or replacement and in many cases this means that the fire must be drawn under the boiler and the same permitted to cool sufficiently to permit working with the valve, and the steam and water drawn off to an extent sufficient to permit removal of the valve. This is a rather long and expensive procedure, particularly where constant operation of the boiler is important.

The primary object of my invention is to provide a valve of this character which will permit the cleaning, repairing and replacement operations above mentioned, without interrupting or affecting the continued operation of the boiler during such operations.

More specifically, my invention contemplates the provision of a valve which when partially turned functions as the ordinary gauge valve to observe the water or steam level in a boiler, and which when further turned or operated, closes off the passage from the boiler and permits the removal of the valve seat and the exposure of the valve itself, whereby the same may be cleaned or repaired as by grinding or polishing.

Another and important object of my invention is to provide a two piece valve casing, one portion of which is removable as above indicated, and such portion being provided with automatic self-aligning means, cooperating with the other part of the casing whereby proper alignment of the valve seats is always insured.

Other objects and advantages in details of construction will be apparent as the description proceeds, reference now being had to the figures of the accompanying drawings forming a part of this application, and wherein like reference numerals indicate like parts.

Figure 1:
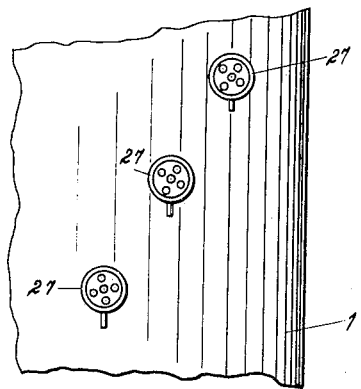
Figure 1 is a detail view of a portion of a boiler equipped with gauge valves in accordance with my invention.
Figure 2:
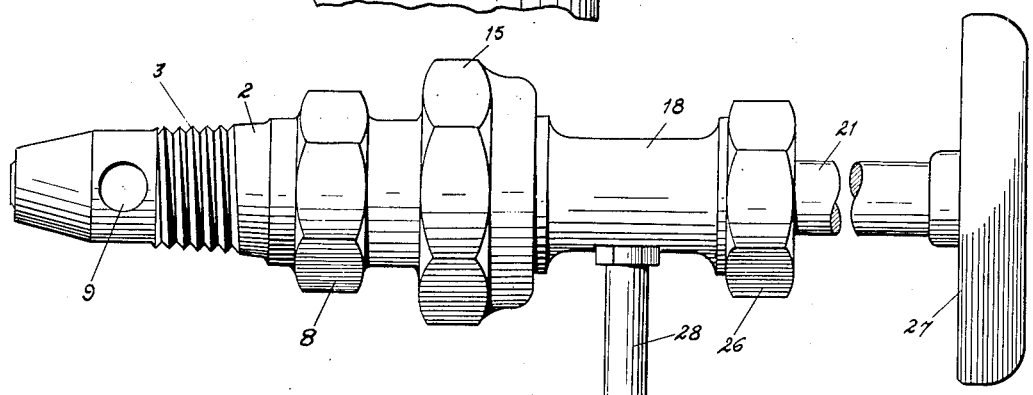
Figure 2 is a side view of my improved valve.

The reference character 1 indicates generally a portion of a boiler into which may be screwed the part 2 of a valve casing, screw threads 3 being provided thereon for this purpose. This part 2 of the valve casing is bored axially to provide the passage 4 therethrough, and such passage at the inner end is reduced and threaded as at 5 to receive the screw threads 6 of the valve stem 7 extending through the passage 4. The nut 8 may be provided on this part 2, preferably integral therewith, to facilitate the attachment or detachment of the part 2 with respect to the boiler 1. The part 2 of the valve casing is provided adjacent its inner end with a lateral opening or passage 9 providing communication between the inside of the boiler 1 and the passage 4 in the valve part 2.

The part 2 of the valve casing 1 is provided at its outer end with a valve seat 10 against which is adapted to be seated the correspondingly shaped valve surface 11 formed on the valve 12 preferably forming a part of and integral with the valve stem 7.

Extending beyond the valve seat 10 and displaced laterally therefrom, is an extension 13 of the part 2 of the casing, the outer periphery of which is screw threaded as at 14 to receive a threaded nut 15. This nut 15 is provided with a forward extension 16 having the shouldered portion 17 thereon for a purpose to be described.

The second part of the valve casing is indicated at 18 and is likewise provided with a central axial passage 19 therethrough, through which extends the reduced portion 20 of the valve stem 7. Beyond this passage 19, the valve stem 7 is enlarged as at 21 to provide a close rotatable fit with the inner enlarged wall 22 of the passage 19, packing material 23 being provided around the portion 21 of the stem and confined within a pocket 24 provided in the outer end of the part 18 of the valve casing, whereby to prevent leakage from the passage 19 out of the casing along the valve stem. The outer end of the part 18 is threaded as at 25 and receives the threaded flanged cap or closure nut 26 encircling the portion 21 of the stem. The extreme outer end of the valve stem 7 is provided with a hand wheel 27 whereby the stem may be rotated in the valve casing, such rotation resulting in endwise movement of the valve stem due to the threaded connections 5 and 6.

The part 18 of the valve casing is provided with an outlet in the form of a short pipe 28 suitably threaded as at 29 through a passage in the side of the part 18 and communicating with the passage 19 therein.

The part 18 of the valve casing is provided adjacent its inner end with a valve seat 30 with which is adapted to normally engage the valve surface 31 on the valve 12.

The inner end of the part 18 of the valve casing is also provided with a circular extension 32 spaced laterally from the valve 12, leaving the space or passage 33 between the valve and such extension. This extension 32 is adapted to lie within and engage with the inner surface of the extension 13 provided on the part 2 of the valve casing. Therefore, with the inner surface of the extension 13 and the outer surface of the extension 32 of proper diameter, the engagement of the parts 2 and 18 of the valve casing in the manner shown in Figure 3, will always automatically result in the two parts being properly aligned, and therefore, also result in the valve seats 10 and 30 being properly aligned with respect to the valve 12 and the surfaces 11 and 31 thereof cooperating with such seats.

The extension 32 on the part 18, is provided with an outwardly disposed circumferential shoulder 34 adapted to abut on one side with the end of the extension 13 of the part 2 and to receive on its opposite side the flange 17 of the nut 15. Obviously, therefore, tightening of the nut 15 will result in securely drawing and holding the parts 2 and 18 of the valve casing rigidly together and in properly aligned relation.

Figure 3:
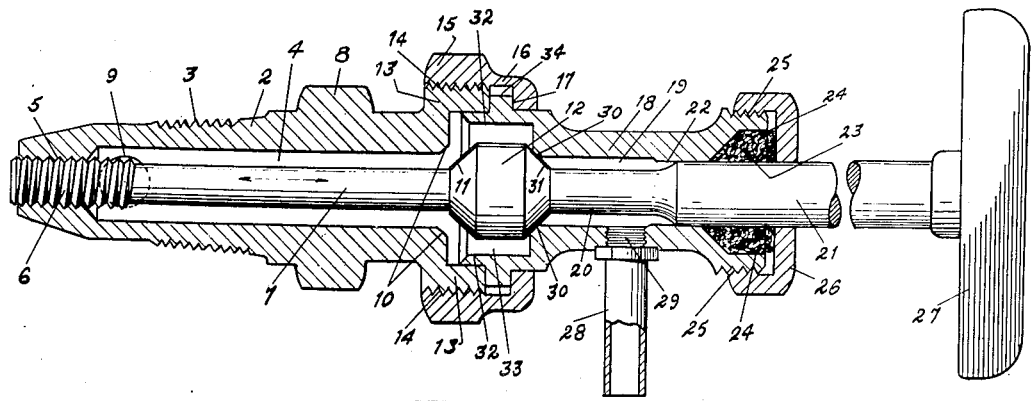
Figure 3 is a side sectional view of my improved valve.

In the operation of my device, the valve stem 7 is normally turned to the position shown in Figure 3, namely, the outer position whereby to close the valve surface 31 against the valve seat 30. This, of course, prevents water and steam from the boiler 1 entering the passage 19 in the part 18 of the casing. Upon rotation of the valve stem 7 in the opposite direction, the valve 12 moves inwardly and opens communication between the inlet 9, the passage 4, the passage 33, the passage 19 and the outlet 28, whereby steam or water may be permitted to flow therethrough from the boiler. If, through continued use or accumulation of foreign matter, the valve surface 31 or the valve seat 30 should require cleaning or repairing, to prevent leakage when the parts are in the normal position shown in Figure 3, the valve stem 7 may be rotated a sufficient amount to bring the valve surface 11 tightly against the valve seat 10, whereby to close the communication between passages 4 and 33. In this position, the nut 15 may be removed, whereupon the part 18 of the valve casing may be withdrawn over the valve stem, the hand wheel 27 of the course being removed in the usual manner.

This permits cleaning, grinding, polishing or renewal of the part 18 with the valve seat 30 thereon. It also results in exposing the valve surface 31 for cleaning or repairing. The re-assembly of these parts is of course obvious.

Thus, there is provided a gauge valve consisting of a two part casing, which permits the cleaning or repairing or renewal of worn parts without affecting the operation of the boiler and which may be quickly taken apart and quickly reassembled, the structure of the valve casing being such as to insure the proper alignment of the valve seats with respect to the valve surfaces.

Of course, changes may be made in details of construction and arrangement of parts without departing from the spirit and scope of my invention. I do not limit myself, therefore, to the exact form herein shown and described other than by the appended claims.

I claim:

1. A gauge valve comprising a two part casing, one part of which is adapted for fixed engagement and communication with a boiler, and the other part of which is adapted for removable engagement with the first named part, a valve seat on each of said parts, and a valve cooperating selectively with either of said seats, said parts having interengageable guide parts whereby to insure proper alignment of said valve seats in operation, said valve including a stem passing through said parts and having screw threaded engagement in said first part.

2. A gauge valve comprising a two part casing, one part of which is adapted for fixed engagement and communication with a boiler, and the other part of which is adapted for removable engagement with the first named part, a valve seat on each of said parts, and a valve cooperating selectively with either of said seats, said parts having interengageable parts whereby to insure proper alignment of said valve seats in operation, said valve including a stem passing through said parts and having screw threaded engagement in said first part, and means for drawing and holding said parts in assembled position.

In testimony whereof, I affix my signature.

GEORGE W. DE FOREST.